Sept. 6, 1955  J. B. SCHMIDT ET AL  2,717,160
FISHING SHELTER
Filed Feb. 3, 1954  2 Sheets-Sheet 1
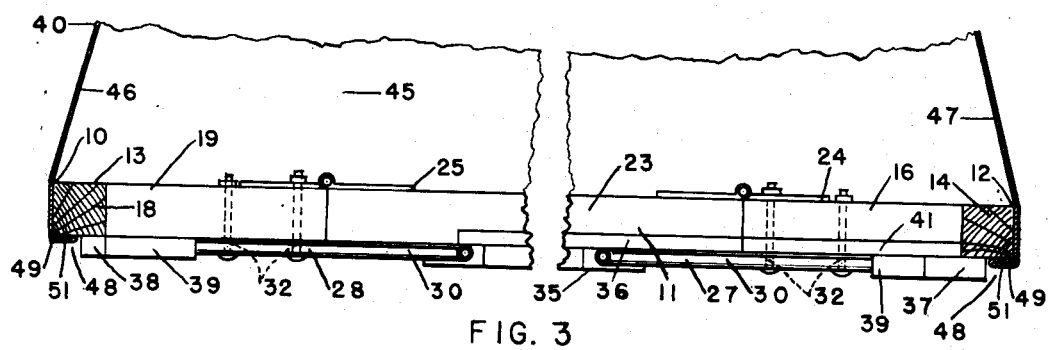
FIG. 3
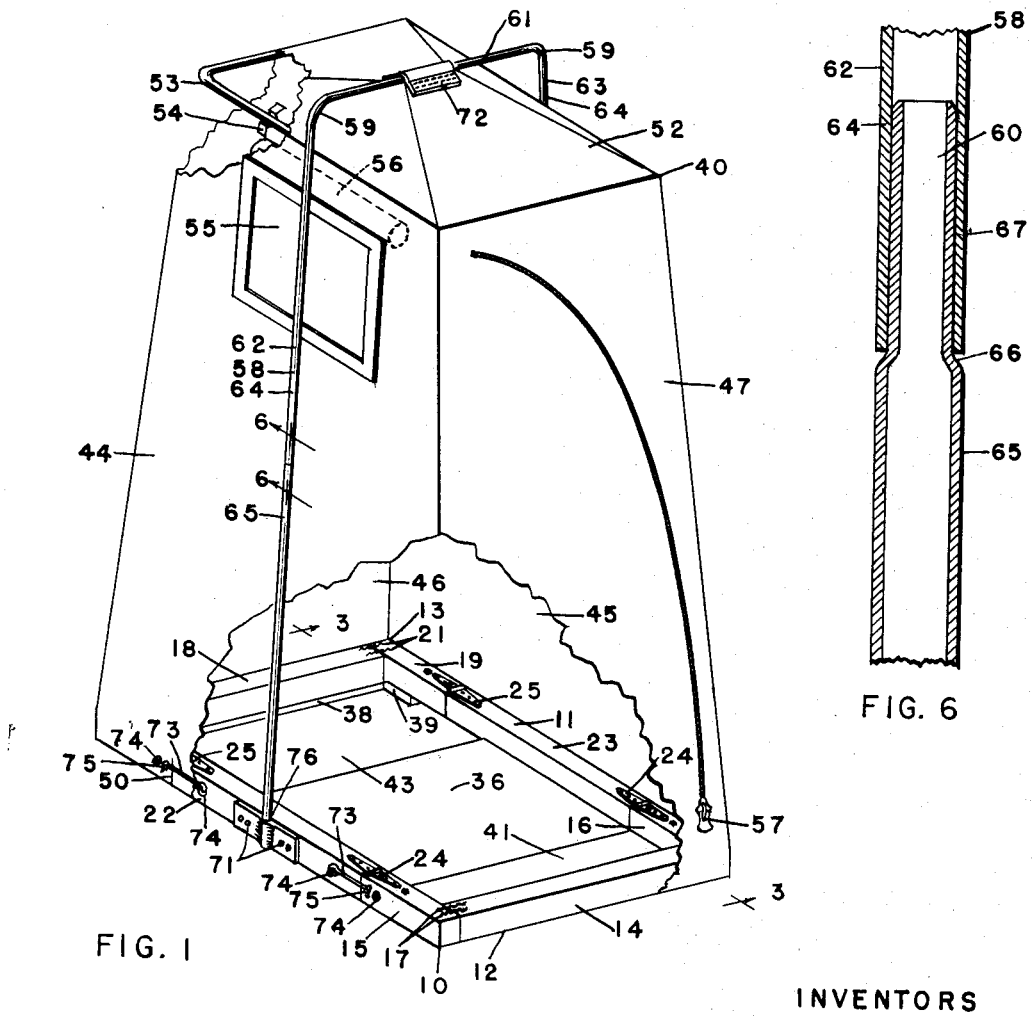
FIG. 1
FIG. 6
INVENTORS
JOHN B. SCHMIDT AND
HAROLD J. HANSON
BY *Caswell & Lagaard*
ATTORNEYS Sept. 6, 1955  J. B. SCHMIDT ET AL  2,717,160
FISHING SHELTER
Filed Feb. 3, 1954                                    2 Sheets-Sheet 2
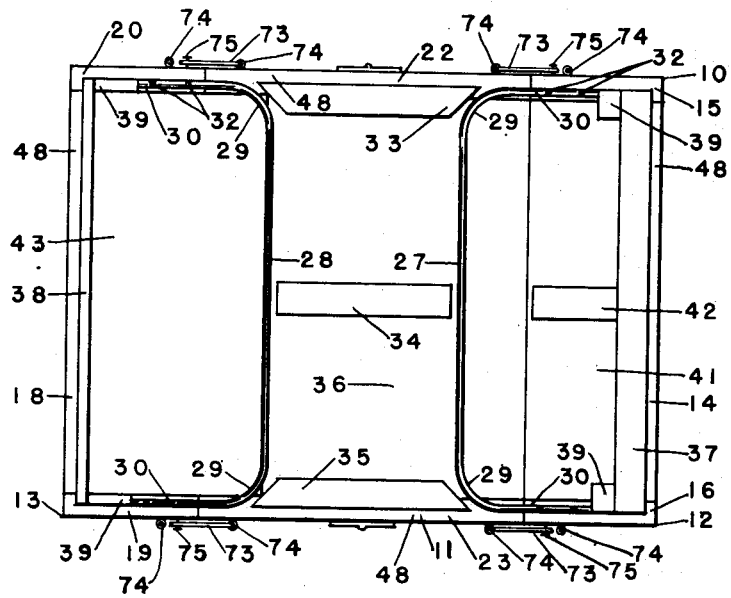
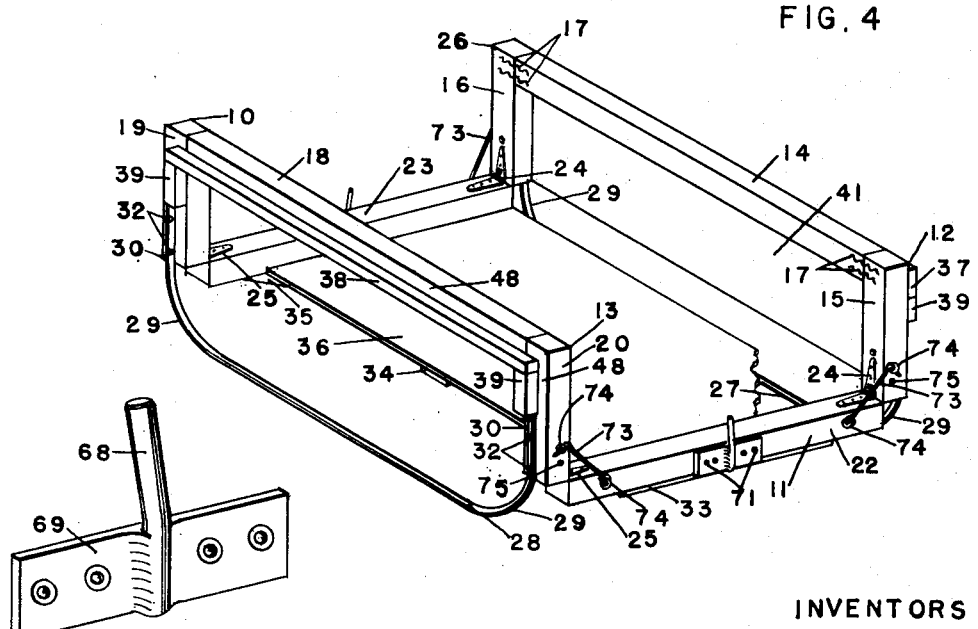
INVENTORS
JOHN B. SCHMIDT AND
HAROLD J. HANSON
BY *Caswell & Lagaard*
ATTORNEYS

United States Patent Office 2,717,160
Patented Sept. 6, 1955

2,717,160

FISHING SHELTER

John B. Schmidt, Minneapolis, and Harold J. Hanson, St. Paul, Minn., assignors to Farmgard Products Company, Minneapolis, Minn., a partnership Application February 3, 1954, Serial No. 407,862

2 Claims. (Cl. 280—20)

The herein disclosed invention relates to fishing shelters and has for an object to provide a shelter which may be moved about readily.

Another object of the invention resides in providing a shelter which may be easily collapsed and packed in a confined space to permit transportation in an automobile.

A still further object of the invention resides in providing a shelter which may be easily erected and taken down.

A still further object of the invention is to provide a shelter having a base formed with sections hingedly connected together and which may be folded to reduce the overall dimensions of the base and to provide a cradle for the reception of the various parts of the shelter.

A still further object of the invention resides in providing runners for the base normally disposed in a position of disuse and upon folding of the base brought into ground engaging position.

A still further object of the invention resides in constructing the shelter with a flexible enclosure and a sectional frame carried by the base and capable of being disassembled to permit of collapsing the enclosure.

Another object of the invention resides in providing a skeleton for maintaining the upper portion of the enclosure erected and in constructing the skeleton of such dimensions as to be readily received within the cradle.

Other objects of the invention reside in the novel combination and arrangement of parts and in the details of construction hereinafter illustrated and/or described.

In the drawings:

Fig. 1 is a perspective view of a fishing shelter illustrating an embodiment of the invention.

Fig. 2 is an inverted view of the bottom of the shelter shown in Fig. 1.

Fig. 3 is a fragmentary longitudinal sectional view of the base of the shelter taken on line 3—3 of Fig. 1 and drawn to a greater scale than Figs. 1 and 2.

Fig. 4 is a perspective view of the base of the shelter showing the sections of the same in folded position and with the enclosure removed.

Fig. 5 is a perspective view of one of the frame supports for the enclosure, drawn to a greater scale than Fig. 1 and detached from the base.

Fig. 6 is a fragmentary longitudinal sectional view of the joint between the sections of the enclosure supporting frame.

The construction shown in the drawings consists of a base constructed in three sections hingedly connected together and adapted to be disposed in a plane or to be folded up to provide a cradle in which portions of the shelter may be received. Attached to the end sections are runners which, when the base is in extended position, lie substantially in the plane thereof and which, when the sections are folded up, are brought into ground engaging positions. The shelter further includes a flexible enclosure supported from a sectional U-shaped frame detachably secured to the base. The uppermost portion of the enclosure is held in proper position by means of a skeleton of such dimensions as to be readily received within the cradle when the shelter is collapsed. When the shelter is collapsed, the shelter and the frame are received in the cradle formed by the folded-up base. When the base is folded up, the same occupies considerably less space than when in extended position, whereby the collapsed structure may be readily and conveniently stored or transported.

The invention consists of a base 10, best shown in Figs. 1, 2 and 3. This base comprises an intermediate section 11 and two end sections 12 and 13. The end section 12 consists of a transverse frame member 14 and two short longitudinal frame members 15 and 16. These frame members are secured together by means of corrugated fasteners 17. The end section 13 is similarly constructed with a transverse frame member 18 and longitudinal frame members 19 and 20. These frame members are also secured together by means of fasteners 21. The intermediate section 11 consists of two longitudinal frame members 22 and 23 which lie in alignment with the longitudinal frame members 15, 16, 19 and 20 of the end sections 12 and 13. All of these frame members are constructed of wood and are rectangular in cross section. The two longitudinal frame members 22 and 23 of the intermediate section 11 are connected to the longitudinal frame members 15 and 16 of the end section 12 by means of hinges 24 secured thereto. Likewise, the longitudinal frame members 22 and 23 of section 11 are connected to the longitudinal frame members 19 and 20 of the end section 13 by means of hinges 25. It will readily be comprehended that the end sections 12 and 13 may be folded upwardly to form a cradle 26 as shown in Fig. 4 for a purpose to be presently described in detail.

Mounted on the base 10 are two runners 27 and 28. These runners are constructed from tubing and are formed near their ends with bends 29 which form legs 30. The runners 27 and 28 are of such length that the legs 30 are substantially the same distance apart as the longitudinal frame members 15 and 16 and 19 and 20. These legs overlie the said frame members and are attached thereto by means of bolts 32 as shown in Fig. 3. The legs 30 are of such length that they project sufficiently below the intermediate frame section 11 when the end sections 12 and 13 are folded up, as shown in Fig. 4, to bring the cradle 26 well above the ground.

As will be noted in Fig. 3, the runners 27 and 28 lie in the plane of the bottom of the base 10 when the end sections thereof are in extended position, and coplanar with the intermediate section 11. To take the weight of the shelter off the said runners, a number of supporting strips 33, 34 and 35 are employed, of which the strips 33 and 35 are attached to the longitudinal frame members 22 and 23 of the intermediate section 11. The supporting strips 33 and 35 project inwardly of the said frame members to form a support for a floor board 36 which is secured thereto. Strip 34 is also secured to this floor board intermediate the ends thereof as shown in Fig. 2. In addition to these supporting strips, two other supporting strips 37 and 38 are employed, which are attached to the transverse frame members 14 and 18 of the end sections 12 and 13. Adjacent the supporting strips 37 and 38 are disposed two supporting blocks 39 which are mounted on the longitudinal frame members 15, 16, 19 and 20 of the end sections 12 and 13. These blocks close the spaces between the strips 37 and 38 and the runners 27 and 28. The end section 12 is provided with a floor board 41 which rests upon the ledges formed by the supporting strip 37 and the juxtaposed blocks 39. Another supporting strip 42 is employed which extends across the floor board 41 intermediate the ends thereof and is attached thereto. This strip lies in alignment with supporting strip 34. The said supporting blocks and all of the supporting strips are of the same height or thickness, which is slightly greater than the diameter of the tubing from which the runners 27 and 28 are constructed so as to take the load off the runners. The floor board 36 terminates at the inner edge of the runner 28 and no floor board is employed with the end section 13 so that an open space 43 is formed and through which the fishing may be accomplished.

Attached to the base 10 is an enclosure 40 which is constructed of canvas or some other suitable weatherproof flexible material. This enclosure is substantially in the shape of a truncated right pyramid having a sloping front 44, back 45, and side walls 46 and 47. The various supporting strips of the base 10 extend inwardly of the frame members of the said base to form outwardly facing rabbets 48. The marginal portions 49 of the lower ends of the front, back, and side walls of the enclosure 40 are turned over and received in the rabbets 48. These portions are secured to the frame members of the base 10 by means of staples 51 driven into the same. In the front wall 44 and back wall 45 of the enclosure 40 and at the localities of the joints between the end sections 13 and 14 of the base 10 and the intermediate section 11 thereof are formed slits 50 which facilitate the folding of the sections relative to one another. The upper end of the enclosure 40 is formed with a top 52 in the shape of a hip-roof. This top is retained in extended position by means of a rectangular skeleton 53 secured to said enclosure at the joinder of the top 52 with the front wall 44, back wall 45 and side walls 46 and 47 by means of straps 54. The said skeleton may be constructed of light weight tubing bent into the desired form. The front wall 44 of the enclosure 40 is provided with a window 55. This window may be covered by means of a roller shade 56 attached to front wall 44 and adapted to be operated from within the enclosure. A twin tab chain fastener 57 applied to the side wall 47 provides an entrance into the interior of the enclosure.

The enclosure 40 is held in erected position by means of a U-shaped supporting structure 58. This supporting structure is constructed from a tube which is formed with bends 59 intermediate its ends providing a cross bar 61 and legs 62 and 63. These legs are sectional in construction and include upper sections 64 and lower sections 65. The upper and lower sections are secured together as shown in detail in Fig. 6. The upper end 60 of the lower section 65 is reduced in diameter as by swaging or otherwise to form a dowel which is received in the lower open end 67 of the upper section 64. By means of this construction a shoulder 66 is formed on which the upper section 64 rests. By means of this construction, the sections may be readily assembled or taken apart when desired. The supporting structure 58 is attached to the base 10 by means of dowels 68 shown in detail in Fig. 5. These dowels are freely received in the open lower ends 76 of the lower sections 65 of the legs 62 and 63 of the supporting structure. Said dowels are welded to plates 69 which are attached to the longitudinal frame members 22 and 23 of the intermediate section 11 of base 10 by means of bolts 71. The top 52 of the enclosure 40 is supported from the cross bar 61 of the supporting structure 58 by means of a hanger 72 which is attached to said top at the apex thereof and through which the cross bar 61 extends.

The manner of using the invention is as follows: The various parts of the shelter, when the shelter is in the erected position, are disposed as shown in Fig. 1. When it is desired to collapse the shelter for transportation or storage, the two end sections 12 and 13 of the base 10 are folded up into vertical positions as shown in Fig. 4. These sections are then attached in such positions by means of the hooks 73 secured to the longitudinal frame members 22 and 23 of the intermediate base section 11 and eyes 74 secured to the longitudinal frame members 15, 16, 19 and 20 of the end base sections 12 and 13. These hooks and eyes overlie the enclosure 40 and are accessible from the exterior of the enclosure. As soon as these sections are in place, the sections 64 and 65 of the legs 62 and 63 of the supporting structure 58 are pulled apart by raising the upper sections until the ends 66 of the lower sections become disengaged from the ends 67 of the upper sections. The parts are now free, and the entire supporting structure 58 may now be collapsed and placed in the cradle 26 formed by the folded base 10. Due to the fact that the enclosure is pyramidal in form, the skeleton 53 can be made small enough so that the same fits within the cradle 26 and likewise the upper part of the supporting structure 58. After these parts have been placed within the cradle, the lower leg sections 65 are placed in the cradle. It will become apparent that upon swinging the end sections 12 and 13 to vertical positions the runners 27 and 28 are caused to project below the base 10 and to support the entire cradle with attached parts at an elevation above ground level. The shelter now is in the form of a sled and by attaching a suitable rope to the legs of the runners, the shelter may be readily transported over the ice or over the ground to and from the place of use. In erecting the shelter, the reverse procedure is adopted.

The advantages of the invention are manifest. The entire shelter can be easily and quickly collapsed into a compact package, greatly facilitating storage and transportation. Upon folding up the end sections of the base, the runners are automatically brought into proper position and the base is converted into a sled by means of which the collapsed shelter may be easily moved about. The shelter is light in weight and affords complete protection from the weather. When the base sections are brought into operative position the runners are completely concealed and out of the way. The shelter can be constructed from materials readily available and economically.

Changes in the specific form of the invention, as herein described, may be made within the scope of what is claimed without departing from the spirit of the invention.

Having described the invention, what is claimed as new and desired to be protected by Letters Patent is:

1. In combination, a base comprising an intermediate section and end sections disposed adjacent thereto, said end sections each consisting of a transverse frame member and longitudinal frame members issuing from the ends of said transverse frame members, said intermediate section including two longitudinal frame members lying in continuation of the longitudinal frame members of the end sections, hinges connecting the adjoining ends of the longitudinal frame members of the intermediate and end sections together and guiding said end sections for movement from positions in which the longitudinal frame members of said intermediate and end sections lie in continuation of one another to positions in which the longitudinal frame members of said end sections become disposed at right angles to the longitudinal frame members of the intermediate section, runners attached to the end sections and extending inwardly beyond the ends of the longitudinal frame members thereof, said runners being adapted to be brought into ground engaging positions when the end sections are angularly disposed relative to the intermediate section, and a flexible enclosure carried by and extending upwardly from said base.

2. In combination, a base comprising an intermediate section and end sections disposed adjacent thereto, said end sections each consisting of a transverse frame member and longitudinal frame members issuing from the ends of said transverse frame members, said intermediate section including two longitudinal frame members lying in continuation of the longitudinal frame members of the end sections, hinges connecting the adjoining ends of the longitudinal frame members of the intermediate and end sections together and guiding said end sections for movement from positions in which the longitudinal frame members of said intermediate and end sections lie in continuation of one another to positions in which the longitudinal frame members of said end sections become disposed at right angles to the longitudinal frame members of the intermediate section, U-shaped runners having spaced parallel legs disposed beneath the longitudinal frame members of said end sections, fasteners extending through said legs and the longitudinal frame members of said end sections for securing the runners thereto and inwardly of the ends of said frame members, said runners upon disposition of the end sections in the plane of the intermediate section lying substantially in the plane of the intermediate section and upon disposition at right angles thereto extending below the intermediate section and in ground engaging position, and a flexible enclosure carried by and extending upwardly from said base.

References Cited in the file of this patent

UNITED STATES PATENTS

| Number | Name | Date |
|---|---|---|
| 431,953 | Pinckney | July 8, 1890 |
| 594,027 | Loebs | Nov. 23, 1897 |
| 1,113,898 | House | Oct. 13, 1914 |
| 1,441,859 | Klimcovitz | Jan. 9, 1923 |
| 1,827,729 | Brooks | Oct. 20, 1931 |
| 2,473,076 | Scheibner | June 14, 1949 |
| 2,546,588 | Ellis | Mar. 27, 1951 |